2,961,209
FISHING ROD HOLDER

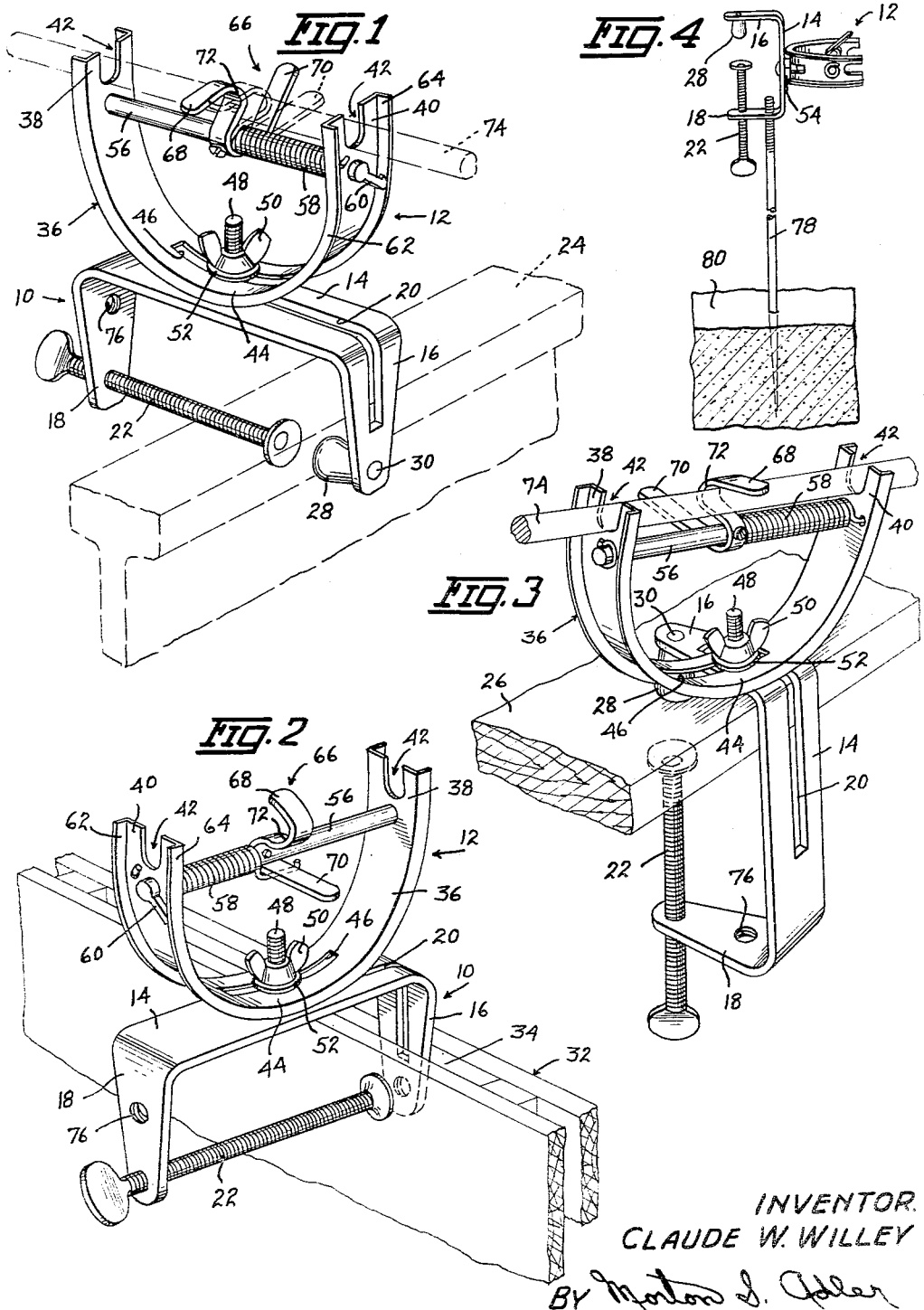

Claude W. Willey, 1603 Hyland, Storm Lake, Iowa

Filed Aug. 28, 1959, Ser. No. 836,706

8 Claims. (Cl. 248—41)

This invention relates to improvements in fishing rod holders and has for one of its objects the provision of such a holder that can be easily attached to and removed from the gunwale or seat of a boat or attached to a rod support which can be imbedded in the ground.

Another object contemplated is to provide a fishing rod holder that will securely hold the rod in a variety of adjustable positions and angles and which affords simple, easy, and efficient means for securing or releasing the rod.

A further object inhering herein is the provision of a rod holder of the above class that is economical to manufacture and durable in construction.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is a perspective view of a preferred embodiment of this rod holder showing a fragmentary portion of a gunwale in broken lines to which it is mounted and showing a fragmentary portion of a fishing rod in broken lines supported thereby, Fig. 2 is a perspective view of this invention shown mounted to a different type of gunwale.

Fig. 3 is a perspective view similar to Fig. 1, but showing this holder mounted to a boat seat, and Fig. 4 is a reduced perspective view showing this holder carrying a rod support for insertion into the ground.

Referring to the drawings, the rod holder comprises generally a fastening means preferably in the form of an elongated C clamp 10 and the rod holder assembly or cradle 12 adjustably secured thereto. Clamp 10 includes the elongated back member 14 and the respective upper and lower oppositely disposed parallel spaced ends 16 and 18 disposed perpendicularly to back member 14. A longitudinal slot 20 extends from approximately the center of back member 14 into end 16 as shown. A tightening bolt means 22 is threadably engaged through clamp end 18 for engaging a gunwale 24 or boat seat 26 in a well known manner and for a gunwale 24 as shown in Fig. 1 a rubber tip 28 on a threaded stub shaft 30 is engaged with end 16 so as to extend toward bolt 22 and thus engage one side of the gunwale 24. Due to the radius on some gunwales of the type shown in Fig. 1 it has been found that use of tip 28 assures clamp 10 against slipping. When used on gunwales of the type 32 shown in Fig. 2, tip 28 can be removed and clamp end 16 inserted into the space 34.

The rod holder assembly or cradle 12 includes an arcuate rod support member 36 of bar or channel material or the like which is formed into a semicircular or C shape so as to present the diametrically disposed rod support ends or arms 38 and 40, each of which is provided with the slot or notch 42 communicating with the respective end thereof. The closed or curved end portion 44 of support 36 is provided with a longitudinal slot 46 which is placed in registering position with slot 20 on the outer side of clamp 10 and a bolt 48 with a wing nut 50 is used for securing support 36 to clamp 10 as shown. Suitable washers 52 and 54 are preferably used above and below portion 44 as shown. A shaft or rod 56 extends between rod support ends 38 and 40 and is connected thereto just below the closed ends of the notches 42, such shaft being spring loaded 58 for rotation about its longitudinal axis. A dog 60 on one end of shaft 56 is positioned to abut against the respective opposite channel sides 62 and 64 of member 40 (Figs. 1 and 2) to limit the rotation of shaft 56 in two respective opposite directions. If bar material is used for member 36, suitable stops can be provided to serve the purpose here of the channel sides 62 and 64. Shaft 56 carries a rod engaging hook member secured thereto for rotation therewith which is designated generally by the numeral 66. Such hook member is of an exaggerated S shape defining a rod engaging hook portion 68 and a thumb or finger operated lever handle 70.

Spring 58 is so arranged as to normally urge hook portion 68 laterally and downwardly relative to the longitudinal axis of shaft 56 whereby the closed end 72 of such hook portion 68 is laterally offset from a direct alignment with slots or notches 42. To insert a fishing rod 74 in this holder, lever 70 is depressed causing hook member 66 to rotate so that its open end is positioned upwardly sufficiently to rest the rod 74 in notches 42 whereby upon release of lever 70, the closed end 72 of hook member 66 embraces a portion of the rod and holds the rod in tight abutting engagement with one of the respective side walls of the notches 42. Rod 74 can be released by depressing lever 70 as described.

From the foregoing description, it will be appreciated that this holder can be easily mounted to or removed from the gunwale of a boat as illustrated in Figs. 1 and 2 and when so mounted the rod 74 is held in a position where the line and lure (not shown) can be extended outwardly from the boat in a normal fishing position. Also the reel and rod handle (not shown) will obviously be in a convenient and accessible position within the boat. By means of slot 46, member 36 can be moved to tilt the rod at any desired angle or rotated so that the rod will extend in any desired direction and nut 50 can be loosened and tightened for such adjustments in an obvious manner.

When this holder is mounted to a boat seat 26 as shown in Fig. 3, assembly 12 is moved in slot 20 of clamp 10 to a position adjacent clamp end 16 where it can be adjusted for direction or tilt as described. Clamp end 18 is also provided with a threaded opening 76 for receiving a support rod or the like 78 which may be inserted into the ground or the like 80 for supporting this rod holder as shown in Fig. 4. In such case, assembly 12 can be used adjacent clamp member 14 as shown or moved adjacent clamp side 16 as illustrated in Fig. 3.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A fishing rod holder, comprising a clamp, an arcuate rod holder defining diametrically disposed ends, each of said ends provided with a notch, said rod holder provided with a longitudinal slot intermediate its ends, means adjustably securing said rod holder through said slot to said clamp, said rod holder rotatable on said means and slidable relative thereto within the limits of said slot, a shaft spring-loaded for rotation about its longitudinal axis rotatably mounted to said rod holder ends, means to limit the rotation of said shaft in two opposite directions respectively, and a rod engaging hook secured to said shaft for rotation therewith intermediate said rod holder ends.

2. A device as defined in claim 1 wherein said clamp includes a back and oppositely disposed parallel spaced sides extending substantially perpendicularly therefrom, said clamp provided with a longitudinal slot extending in part in said back and in part in one side thereof, the means securing said rod holder to said clamp extending through the slot is said clamp, and said rod holder slidable relative to said clamp within the limits of the slot therein and selectively securable thereto within such limits.

3. A fishing rod holder, comprising a clamp, an arcuate rod holder defining diametrically disposed ends, each of said ends provided with a notch for receiving a fishing rod, said rod holder provided with a longitudinal slot intermediate its ends, means adjustably securing said rod holder through said slot to said clamp, said rod holder rotatable on said means and slidable relative thereto within the limits of said slot, a shaft spring-loaded for rotation about its longitudinal axis rotatably mounted to said rod holder ends, a rod engaging hook secured to said shaft for rotation therewith intermediate said rod holder ends and in substantially the same plane as said notches, and said shaft normally urging said rod engaging hook to a position laterally offset relative to direct alignment with said notches.

4. In a fishing rod holder, a clamp adapted for removable attachment to a support such as a gun wale, boat seat or the like, a cradle rotatably tiltably mounted to said clamp, means to releasably secure said cradle in selective angular positions relative to said clamp, said cradle including spaced arms adapted to receive a fishing rod and engage the same at longitudinal spaced points thereon, a shaft extending between and mounted on said arms, said shaft being spring-loaded for rotation about its longitudinal axis, and a fishing rod engaging hood secured to said shaft for rotation therewith intermediate said arms.

5. In a fishing rod holder, a fastening means adapted for removable attachment to a support such as a gunwale, boat seat or the like, a cradle rotatably tiltably mounted to said fastening means, means to releasably secure said cradle in selective angular positions relative to said fastening means, said cradle including spaced arms adapted to receive a fishing rod and engage the same at longitudinal spaced points thereon, a shaft extending between and mounted on said arms, said shaft being spring loaded for rotation about its longitudinal axis, means to limit the rotation of said shaft in two opposite directions respectively, and a fishing rod engaging hook secured to said shaft for rotation therewith intermediate said arms.

6. A fishing rod holder, comprising a clamp, an arcuate rod holder defining diametrically disposed ends, each of said ends provided with a notch for receiving a fishing rod, a shaft extending between said ends and rotatably mounted thereto below said notches, said shaft being spring loaded for rotation about its longitudinal axis, and a rod engaging hook secured to said shaft for rotation therewith intermediate said rod holder ends.

7. A fishing rod holder, comprising a clamp, an arcuate rod holder defining diametrically disposed ends, each of said ends provided with a notch for receiving a fishing rod, a shaft extending between said ends and rotatably mounted thereto below said notches, said shaft being spring loaded for rotation about its longitudinal axis, a rod engaging hook secured to said shaft for rotation therewith intermediate said rod holder ends, said rod engaging hook normally held by said spring loaded shaft in rod engaging position, and said rod engaging position being laterally off-set relative to direct alignment with said notches whereby the rod engaged is urged into frictional contact wtih the sidewalls of said notches.

8. A fishing rod holder, comprising a clamp, an arcuate rod holder defining diametrically disposed ends, each of said ends provided with a notch for receiving a fishing rod, a shaft extending between said ends and rotatably mounted thereto below said notches, said shaft being spring loaded for rotation about its longitudinal axis, a rod engaging hook secured to said shaft for rotation therewith intermediate said rod holder ends, said rod engaging hook normally held by said spring loaded shaft in rod engaging position, said rod engaging position being laterally off-set relative to direct alignment with said notches whereby the rod engaged is urged into frictional contact with the sidewalls of said notches, a manually operable lever integral with said rod engaging hook, depression of said lever causing said rod engaging hook to rotate with said shaft out of alignment with said notches, and said rod engaging member automatically returning to rod engaging position upon release of said lever.

References Cited in the file of this patent

UNITED STATES PATENTS

| | | |
|---|---|---|
| 1,992,165 | Bardon | Feb. 26, 1935 |
| 2,599,160 | Brauer | June 3, 1952 |
| 2,657,492 | Skorr | Nov. 3, 1953 |
| 2,694,538 | Consolo et al. | Nov. 16, 1954 |
| 2,887,287 | Ross | May 19, 1959 |